United States Patent
Casey et al.

(10) Patent No.: US 12,248,474 B2
(45) Date of Patent: Mar. 11, 2025

(54) SUGGESTING OBJECT IDENTIFIERS TO INCLUDE IN A COMMUNICATION

(71) Applicant: Pinterest, Inc., San Francisco, CA (US)

(72) Inventors: Hayder Casey, San Francisco, CA (US); Naveen Gavini, San Francisco, CA (US); Daniel Isaac Lurie, San Francisco, CA (US); Ryan Wilson Probasco, San Leandro, CA (US); Angel Steger, San Francisco, CA (US); Martin Eric Weiner, Jr., Mountain View, CA (US)

(73) Assignee: Pinterest, Inc., San Francisco, CA (US)

( * ) Notice: Subject to any disclaimer, the term of this patent is extended or adjusted under 35 U.S.C. 154(b) by 0 days.

(21) Appl. No.: 18/629,870

(22) Filed: Apr. 8, 2024

(65) Prior Publication Data
US 2024/0256544 A1 Aug. 1, 2024

Related U.S. Application Data

(63) Continuation of application No. 15/857,440, filed on Dec. 28, 2017, now abandoned, which is a
(Continued)

(51) Int. Cl.
*G06F 16/245* (2019.01)
*G06F 16/2453* (2019.01)
(Continued)

(52) U.S. Cl.
CPC .. *G06F 16/24545* (2019.01); *G06F 16/24578* (2019.01); *G06F 16/907* (2019.01); *G06N 7/01* (2023.01)

(58) Field of Classification Search
CPC ............ G06F 16/24545; G06F 16/907; G06F 16/24578; G06N 7/01
See application file for complete search history.

(56) References Cited

U.S. PATENT DOCUMENTS

| 5,583,763 A | 12/1996 | Atcheson et al. |
| 6,415,282 B1 | 7/2002 | Mukherjea et al. |

(Continued)

FOREIGN PATENT DOCUMENTS

| JP | 2013516902 A | 5/2013 |
| JP | 2016530613 A | 9/2016 |

(Continued)

OTHER PUBLICATIONS

International Search Report and Written Opinion for International Application No. PCT/US2016/049136 dated Nov. 18, 2016.
(Continued)

*Primary Examiner* — Truong V Vo
(74) *Attorney, Agent, or Firm* — Haynes and Boone, LLP

(57) ABSTRACT

Described are systems and methods that suggest candidate recipients to receive an object identifier from a first user. For example, a first user, independent of a conversation with a second user, may select, close-up, or otherwise view an object identifier. The system, upon detecting the interaction with the object identifier by the first user, may determine one or more second users to suggest to the first user as candidate recipients with which the first user can share the viewed object identifier. The systems and methods may also suggest object identifiers to share with a selected recipient and/or determine two or more users that have a common connection and share an object identifier related to the connection with each of those users.

16 Claims, 12 Drawing Sheets

Related U.S. Application Data continuation-in-part of application No. 14/837,771, filed on Aug. 27, 2015, now abandoned.

(51) Int. Cl.
*G06F 16/2457* (2019.01)
*G06F 16/907* (2019.01)
*G06N 7/01* (2023.01)

(56) References Cited

U.S. PATENT DOCUMENTS

| | | | |
|---|---|---|---|
| 7,627,828 | B1 | 12/2009 | Collison et al. |
| 8,655,916 | B2 | 2/2014 | Roy |
| 9,092,742 | B1 | 7/2015 | Zeng et al. |
| 9,122,758 | B1 | 9/2015 | Blower et al. |
| 9,531,823 | B1 | 12/2016 | Suchland et al. |
| 2001/0019338 | A1 | 9/2001 | Roth |
| 2002/0138582 | A1 | 9/2002 | Chandra et al. |
| 2005/0289220 | A1 | 12/2005 | Chen et al. |
| 2006/0075068 | A1 | 4/2006 | Kasriel et al. |
| 2007/0150368 | A1 | 6/2007 | Arora et al. |
| 2010/0005399 | A1 | 1/2010 | Friedman et al. |
| 2011/0119628 | A1 | 5/2011 | Carter et al. |
| 2011/0167456 | A1 | 7/2011 | Kokenos et al. |
| 2011/0302249 | A1 | 12/2011 | Orr et al. |
| 2012/0041907 | A1 | 2/2012 | Wang et al. |
| 2012/0054638 | A1 | 3/2012 | Ingoldby et al. |
| 2012/0060176 | A1 | 3/2012 | Chai et al. |
| 2012/0278348 | A1 | 11/2012 | Chardon et al. |
| 2013/0054718 | A1 | 2/2013 | Davies et al. |
| 2013/0198204 | A1 | 8/2013 | Williams et al. |
| 2013/0232204 | A1 | 9/2013 | Barney et al. |
| 2014/0025737 | A1 | 1/2014 | Kruglick |
| 2014/0108393 | A1 | 4/2014 | Angwin |
| 2014/0164172 | A1 | 6/2014 | Du et al. |
| 2014/0181690 | A1 | 6/2014 | Shartzer |
| 2014/0364097 | A1 | 12/2014 | Bauer et al. |
| 2014/0365313 | A1 | 12/2014 | Reese et al. |
| 2015/0026642 | A1 | 1/2015 | Wilson et al. |
| 2015/0092070 | A1 | 4/2015 | Hatano et al. |
| 2015/0134659 | A1 | 5/2015 | Meyer et al. |
| 2015/0134688 | A1 | 5/2015 | Jing et al. |
| 2015/0161126 | A1 | 6/2015 | Wang et al. |
| 2015/0193554 | A1 | 7/2015 | Yang |
| 2015/0205784 | A1 | 7/2015 | Mese et al. |
| 2015/0347919 | A1 | 12/2015 | Bastide et al. |
| 2016/0117344 | A1 | 4/2016 | Kleinpeter et al. |
| 2016/0156584 | A1 | 6/2016 | Hum et al. |
| 2016/0179967 | A1 | 6/2016 | Sa et al. |
| 2016/0226804 | A1 | 8/2016 | Hampson et al. |
| 2019/0102396 | A1* | 4/2019 | Pan .................. H04L 51/52 |

FOREIGN PATENT DOCUMENTS

| | | |
|---|---|---|
| JP | 2017504861 A | 2/2017 |
| WO | 2015101440 A1 | 7/2015 |

OTHER PUBLICATIONS

Supplementary European Search Report for European Patent Application No. 16840240.2, dated Mar. 28, 2019.

\* cited by examiner

SUGGESTING OBJECT IDENTIFIERS TO INCLUDE IN A COMMUNICATION

PRIORITY CLAIM

This application is a continuation of U.S. patent application Ser. No. 15/857,440, filed Dec. 28, 2017 and entitled "Suggesting Object Identifiers And Recipients For Communication," which is a continuation-in-part of U.S. patent application Ser. No. 14/837,771, filed Aug. 27, 2015 and entitled "Suggesting Object Identifiers To Include In A Communication," the contents of both of which are hereby incorporated by reference herein in their entities.

BACKGROUND

People are increasingly interacting with computers and other electronic devices in new and interesting ways. With the increased processing capabilities, connectivity and location tracking, electronic devices have become widespread and used in many everyday activities. For example, people often use electronic devices to search for products, watch videos, listen to music, research, shop for both digital and physical products ("e-commerce"), and receive news, just to name a few. Other uses include communicating with other users, communicating via social communities, photography, and many others.

Objects are typically made available and people search for objects, based on information about the object for which they are searching. Keywords that describe an object are often associated with the object and, when people search using one or more of those keywords, the object may be returned as a result.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

Figure 1:
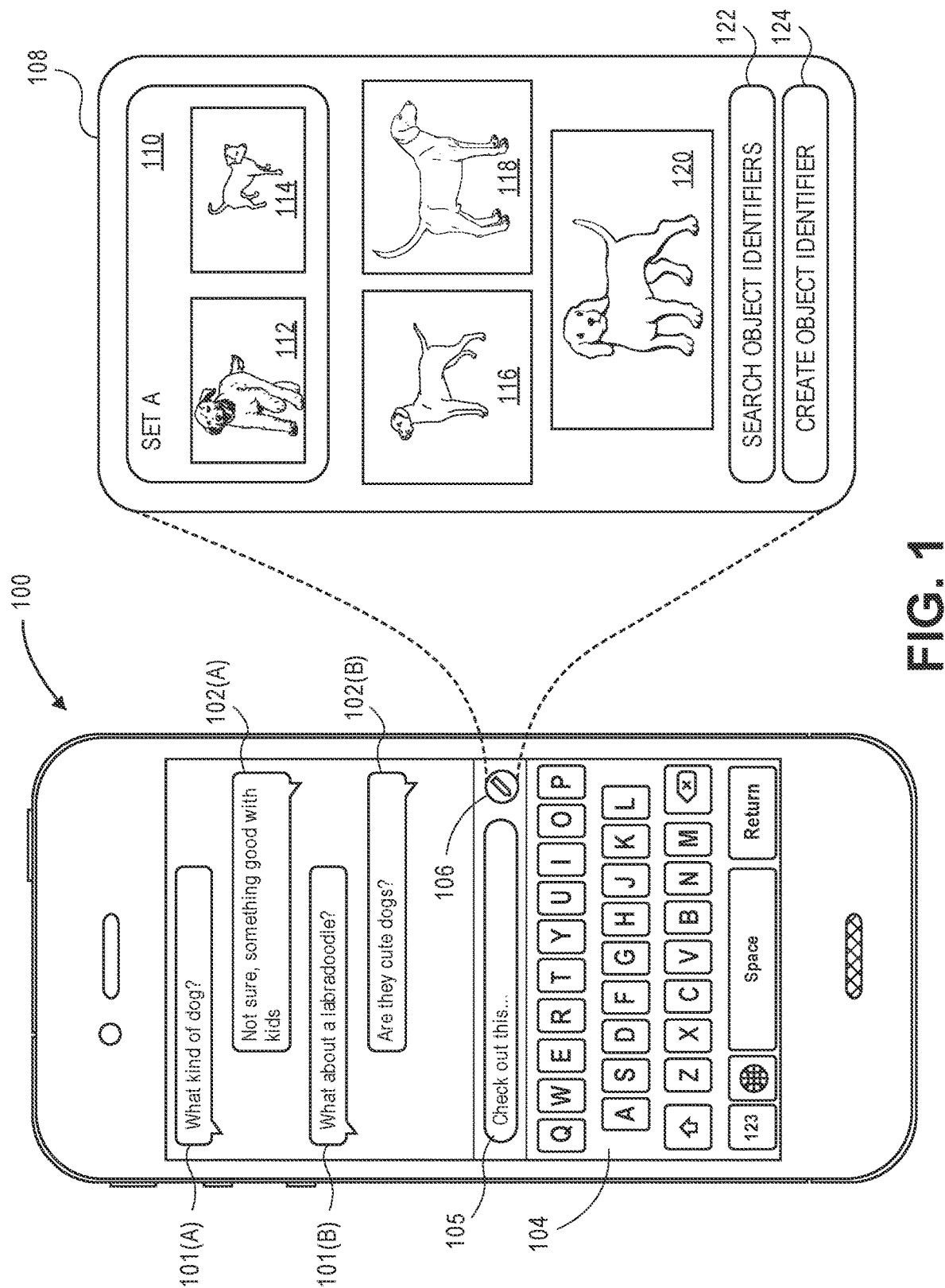
FIG. 1 is an illustration of a communication between a first user and a second user and a first user being presented with suggested object identifiers, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and methods for determining object identifiers to suggest to a first user for use in including in a communication with a second user. For example, a first user (sending user) may be communicating in an Internet based social community with a second user (receiving user) via a chat messaging interface. As part of that communication, the first user may desire to send, present or otherwise share an object identifier, such as an image of an object, with the second user. In traditional systems, the user can search for (e.g., using a keyword search) an image, select the image, and then share the image with the second user.

The systems and methods discussed herein determine object identifiers that are potentially relevant to the communication and/or the users and suggest one or more of those object identifiers to the first user for selection and sharing with the second user. For example, the object management service may process the communication exchange between the first user and the second user to determine a communication context. That communication context may then be used to determine object identifiers associated with the first user that are potentially relevant to the communication between the first user and the second user. The determined object identifiers may then be presented to the first user for selection by the first user to share with the second user. In other implementations, the object management service may determine a first set of object identifiers associated with the first user and a second set of object identifiers associated with the second user in which one or more of the object identifiers of the two sets overlap (e.g., are the same or similar object identifiers). Other object identifiers of the first user's first set may then be suggested to the first user for sharing with the second user.

By determining object identifiers to suggest for sharing with other users during a communication, the user need not search for object identifiers that are potentially relevant to the communication and/or the user with which they are communicating. Likewise, because the object management service has knowledge of the object identifiers associated with the users involved in the communication exchange, it can often better assess which object identifiers are more likely to be of interest to a receiving user. For example, suggested object identifiers may be determined such that they only include object identifiers that are not already associated with the receiving user.

In still other implementations, the system may suggest candidate recipients (second users) for receiving an object identifier from the first user. For example, a first user, independent of a conversation with a second user, may select, close-up, or otherwise view an object identifier. The system, upon detecting the view of the object identifier by the first user, may determine one or more second users to suggest to the first user as candidate recipients with which the first user can share the viewed object identifier. In some implementations, the candidate recipients may be known or have an association with the first user, may be users for which increased activity is desired, and/or may be users that are determined to have a potential interest in the viewed object identifier.

For purposes of discussion, an "object identifier," as used herein, is a collection of one or more items of information that identifies an object. The object identifier may include any combination of: a representation for the object, such as a graphical representation, audible representation, or other representation of the object; a context for the object as understood by the user; a description of the object provided by the user; static information about the object; supplemental information about the object; the set to which the object belongs (discussed below); the source of the object; any parent object identifier from which the object identifier was created; a context of the object; and any identification of other similar object identifiers. As will be appreciated, additional or fewer items of information may be included in an object identifier.

As discussed in further detail herein, a context represents information about an object as understood by the user. The context explains why the object is important to the user that created the object identifier. In some implementations, context(s) may be provided directly by the user or determined based on other information provided by or about the user. Static information about an object may be any information about the object that does not change. Such information may be provided by the user, by other users, and/or by external sources.

The methods and systems described herein further enable users to manage, search for, share and discover objects by organizing object identifiers into "sets." For example, users may create one or more sets and object identifiers may be associated with those sets. Generally, a "set" is a collection of object identifiers created by a user. In one implementation, each set may include any number of object identifiers, including zero (a null set). An object identifier may be associated with one or many sets and one or many users. In one implementation, an object identifier may only be associated with one set. Like object identifiers, sets may have a context. A set may also include a category, such as travel, sports, animals, art, education, food and drink, etc.

Users can create object identifiers and add them to sets based on representations for objects provided or identified by the user or by adding existing object identifiers to their own set of object identifiers. An "object" may be anything that can be represented. For example, a user may create an object identifier for a television show, an image, a physical object, a sound, a web page, a location, a digital object, and the like. Object identifiers created with representations provided or identified by a user are considered parent object identifier relationships. Object identifiers created based on existing object identifiers are considered child object identifiers. An object identifier may have any number of parent and/or child object identifiers. As discussed further below, relationships (e.g., parent/child) between object identifiers may be maintained to allow users to discover other objects and to understand the source of the object represented by an object identifier.

FIG. 1 is an illustration of a communication between a first user and a second user, and a first user being presented with suggested object identifiers, according to an implementation. In this example, the first user (not shown) is communicating with a second user (not shown) in a real-time chat session that is part of a social community. The first user is utilizing a client device 100 to send and receive messages. As discussed below with respect to FIG. 11, the client device may be any type of device capable of sending and receiving communications, receiving user input and providing output to a user of the client device 100.

In this example, the display of the client device presents several textual communication exchanges between the first user and the second user. In this example, the first user has asked "What kind of dog?" 101(A) and the second user has responded with "Not sure, something good with kids" 102 (A). In this example, the first user inputs textual information in the input field 105 by selecting keys on the keyboard 104 that is presented on the touch-based display of the client device 100. When the input is complete, the client device 100 presents the input information on the display of the client device 100 and transmits the textual information as a communication to a client device of the second user. Likewise, when a communication from the second user is received by the client device 100, the textual information is presented as part of the communication on the display of the client device 100.

In this example, the first user has input two communications 101(A), 101(B) and received two communications 102(A), 102(B), which are presented on opposing sides of the display of the client device to differentiate between communications sent from the client device 100 (presented on the left side of the display of the client device) and communications received by the client device 100 (presented on the right side of the display of the client device).

While this example illustrates a textual based communication exchange, any form of communication (e.g., textual, audio, video images) may be sent and/or received as part of the communication. For example, if the first user (sending user) desires to include an object identifier in the communication such that the object identifier is shared with the second user, the first user may select the object identifier control 106. Upon selecting the object identifier control, the first user is presented, via the display of the client device 100, with an object identifier selection interface 108. The object identifier selection interface presents to the user suggested object identifiers 112, 114, 116, 118, 120, the option to search for other object identifiers, as illustrated by the "Search Object Identifiers" control 122, and the option to create an object identifier, as illustrated by the "Create Object Identifiers" control 124.

Rather than just presenting object identifiers for selection or requiring the user to search for object identifiers (e.g., using keyword inputs), the suggested object identifiers that are presented to the user via the object identifier selection interface 108 are determined by the object management service to be relevant to the current communication exchange and/or relevant with respect to the first user and the second user, as discussed further below.

While the examples discussed herein describe a communication exchange between a first user and a second user, the communication exchange may be among any number of users. For example, the communication exchange may be between a first user (user sending the object identifier) and any number of users that are receiving the object identifier selected by the first user for inclusion in the communication exchange.

In this example, because the communication exchange between the first user and the second user was determined by the object management service to be related to dogs, the object management service determined and presented to the first user for selection suggested object identifiers related to dogs. The determined context of a communication is referred to herein as a communication context. In this example, the two object identifiers 112, 114 are associated with the first user and included in Set A 110, a set created by and associated with the first user. Set A also includes other object identifiers that overlap (e.g., are the same or similar) to object identifiers associated with object identifiers of a set created by the second user. The object identifiers 116, 118 are determined to be relevant to the context of the communication, but are not associated with either the first user or the second user. Finally, object identifier 120 is determined to be relevant to the context of the communication and included in Set B, a set created by and associated with the first user but does not include object identifiers that overlap with object identifiers included in a set associated with the second user.

Suggested object identifiers may be determined by the object management service based on a relevance and/or association with the first user, a potential relevance to the second user, a relevance to the communication context, or any combination thereof. Likewise, in some examples, suggested object identifiers may be only those object identifiers that are not associated with the second user and/or that have not been previously viewed and/or shared with the second user.

Figure 2:
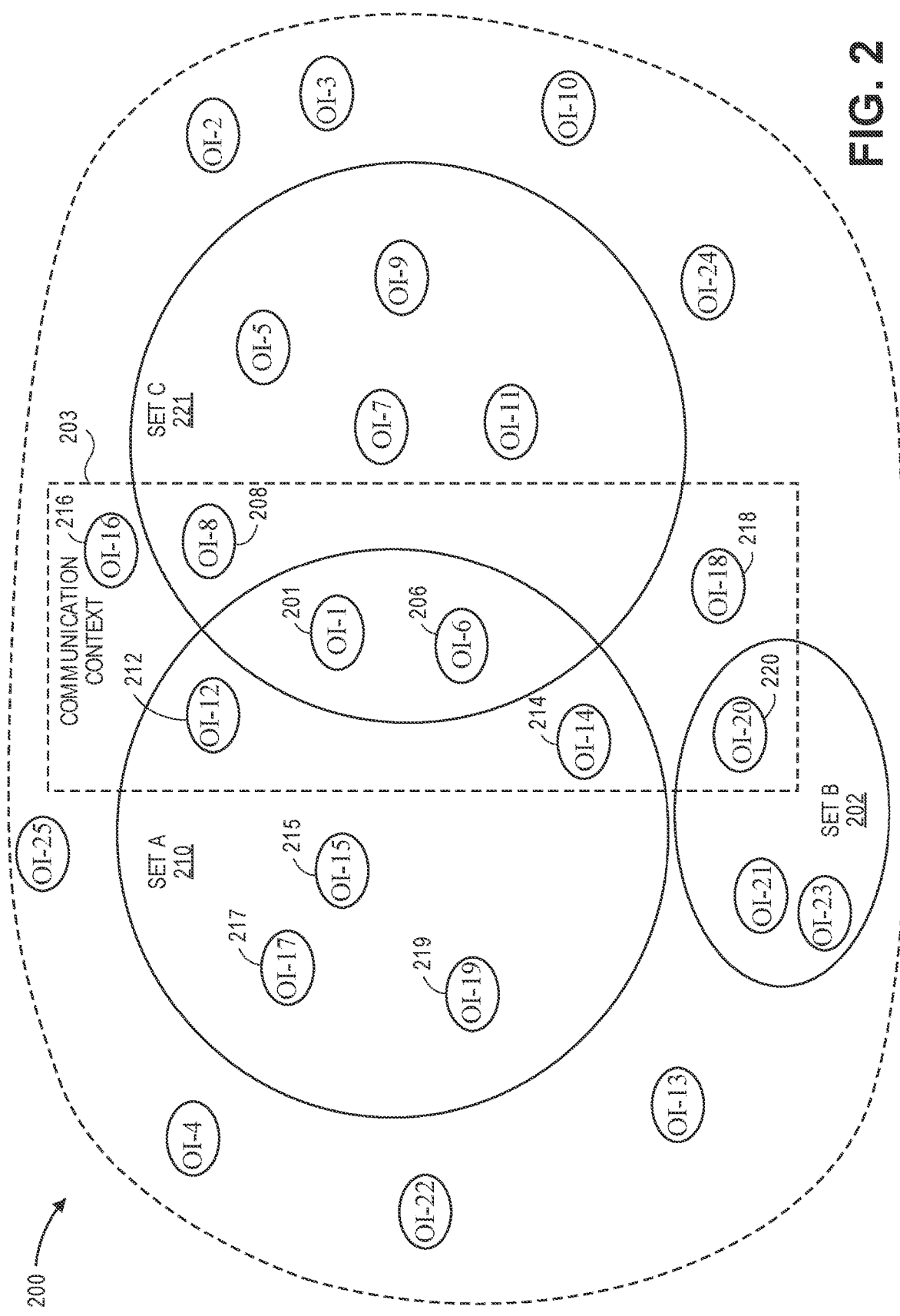
FIG. 2 is a block diagram of a corpus of object identifiers, according to an implementation.

FIG. 2 is a block diagram of a corpus 200 of object identifiers and determining suggested object identifiers for presentation to a first user for sharing with a second user, according to an implementation. The object management service maintains a corpus of object identifiers that may be selected, viewed, created, shared, etc., by users of the object management service. For example, as discussed below with respect to FIG. 10, a user may create an object identifier that includes an image of an object and the object management service will associate that object identifier with the user. Likewise, the user may associate or include the object identifier in one or more sets created by the user, share the object identifier with other users, etc. In some implementations, the object management service may maintain millions of object identifiers, each of which may be associated with one or many users, one or many sets, etc.

Continuing with the example discussed above with respect to FIG. 1, the object management service may determine a communication context 203 associated with a communication between two or more users (e.g., user 1 and user 2). Alternatively, or in addition thereto, the object management service may determine sets of the users that include one or more overlapping object identifiers. In this example, Set A 210 is associated with a first user and Set C 221 is associated with the second user. The two sets overlap because both sets include an association with object identifiers OI-1 201 and OI-6 206.

In either case, the object management service may determine a candidate suggestion set that includes object identifiers determined to be of potential interest to the receiving user. For example, if the object identifiers are determined based on the determined communication context 203, the candidate suggestion set will, in this example, include object identifiers OI-16 216, OI-8 208, OI-12 212, OI-1 201, OI-6 206, OI-14 214, OI-20 220, and OI-18 218 because each of those object identifiers are associated with a same context as the determined communication context. For example, if the determined communication context is dogs, each of the object identifiers of the corpus 200 that include the context dogs will initially be included in the candidate suggestion set.

If the object management service is determining a candidate suggestion set based on sets with overlapping object identifiers between the users, it will include object identifiers of the set associated with the sending user. For example, if the first user is requesting object identifiers to include in a communication to a second user, the first user created Set A 210, and the second user created Set C 221 may be determined to include overlapping object identifiers and the candidate suggestion set will include object identifiers of Set A 210. In this example, the object identifiers included in the candidate suggestion set will be OI-12 212, OI-1 201, OI-6 206, OI-14 214, OI-17 217, OI-15 215, and OI-19 219.

If the object management service is determining a candidate suggestion set based on the communication context and sets with overlapping object identifiers between the users, it will include object identifiers including a context matching the communication context or object identifiers within the set associated with the sending user. In some implementations, the object management service may include object identifiers that include the same communication context or that are within a sending user set that overlaps with a receiving user set. In such an implementation, referring again to the example illustrated in FIG. 2, the candidate suggestion set will include OI-16 216, OI-8 208, OI-12 212, OI-1 201, OI-6 206, OI-14 214, OI-18 218, OI-20 220, OI-17 217, OI-15 215, and OI-19 219.

Alternatively, the object management service may only include object identifiers in the candidate suggestion set that include a same context as the determined communication context and that are within a sending user set that overlaps with a receiving user set. In such an implementation, the candidate suggestion set will include object identifiers OI-12 212, OI-1 201, OI-6 206, and OI-14 214.

In some implementations, before object identifiers of the candidate suggestion set are presented as suggested object identifiers, those object identifiers that are associated with the receiving user, in this example the second user that created Set C 221, are removed from the candidate suggestion set. For example, if the candidate suggestion set is based on the determined communication context, the object identifiers OI-8 208, OI-1 201, and OI-6 206 that are associated with the second user are removed from the candidate suggestion set because they are already associated with the receiving user.

In implementations in which the candidate suggestion set is based on object identifiers included in a set associated with a sending user that includes one or more object identifiers of a set associated with the receiving user, the overlapping object identifiers may be removed from the candidate suggestion set. For example, if the candidate suggestion set is based on overlapping sets of Set A and Set C, object identifiers OI-1 201 and OI-6 206 may be removed from the candidate suggestion set because they are already associated with the second user.

Likewise, in some implementations, the object identifiers of the candidate suggestion set may be weighted to determine which of the object identifiers of the candidate suggestion set to present to the sending user. For example, object identifiers determined to have a high relevance to the communication context, having a higher relevance to the sending user, a potential relevance to the receiving user, a time since the object identifier was shared by the sending user, having a higher rating by the sending user and/or other users, included in multiple sets of the sending user, more recently associated with the sending user, having a high co-occurrence or similarity to other object identifiers associated with the sending user and/or the receiving user(s), etc., may be assigned a higher weight than others of the candidate suggestion set.

After removing object identifiers and/or weighting object identifiers, one or more of the object identifiers included in the candidate suggestion set are provided to the sending user for selection such that the sending user can include an object identifier in a communication with a receiving user.

Figure 3:
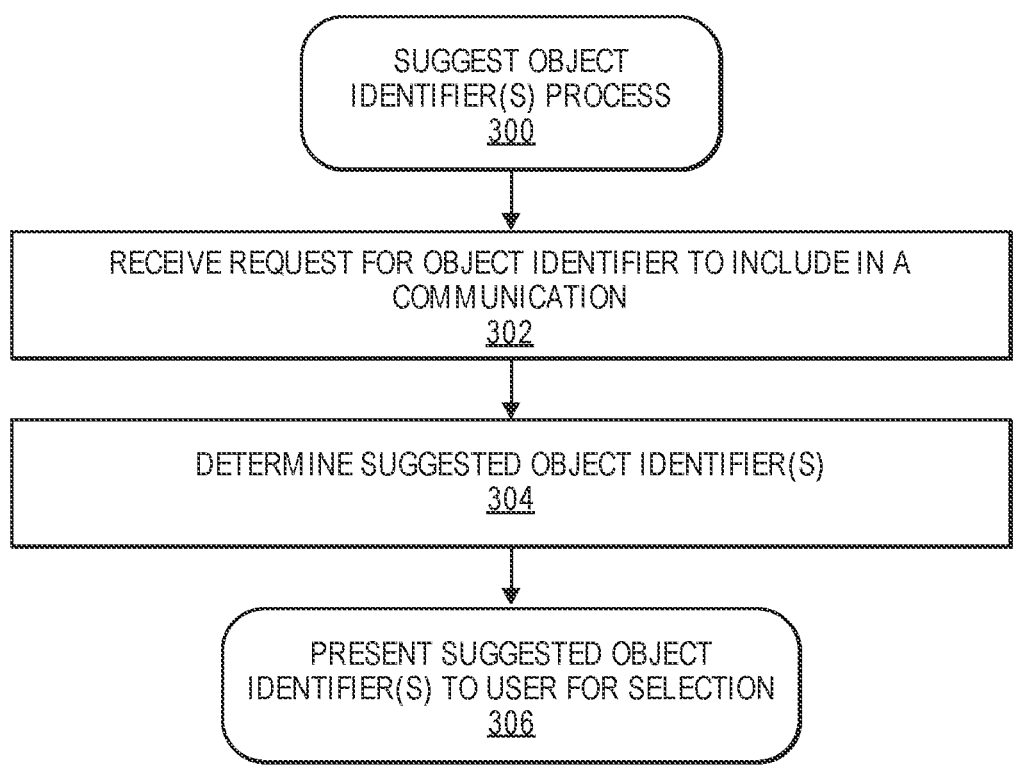
FIG. 3 illustrates an example suggest object identifier(s) process, according to an implementation.

FIG. 3 illustrates an example suggested object identifier (s) process 300, according to an implementation. The example process 300 and each of the other processes described herein are illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. The order in which the operations are described is not intended to be construed as a limitation, and any number of the described operations can be combined in any order and/or in parallel to implement the process. Likewise, additional or fewer operations than those described may be utilized with the various implementations described herein.

The example process 300 begins upon receipt of a request by a user for an object identifier to include in a communication with one or more other users, as in 302. As discussed above with respect to FIG. 1, as part of a communication between users, one of the users may select a displayed control button, or otherwise input a request for object identifiers to include in the communication that is shared with other users. Alternatively, the request for an object identifier may be at an initiation of a communication from a first user to a second user, as discussed below with respect to FIG. 6. In still another implementation, the request may be from the object management service rather than a user. For example, the object management service may determine that a communication should be initiated between a first user and a second user. To cause or encourage the communication, the object management service may determine one or more suggested object identifiers that are then presented to the first user with information relating to the second user about the object identifier and/or the context of the object identifier.

For example, if the object management service determines to establish a communication between a first user and a second user, the object management service may determine a context or current interest of the second user that is also of interest to the first user. The object management service may then determine one or more object identifiers corresponding to the context to present to the first user and an indication that the second user is interested in the context associated with the object identifier. As an illustration, and continuing with the dog example, the object management service may determine that the second user is interested in dogs and that the first user is interested in dogs. Likewise, the object management service may determine a set associated with the first user that includes one or more object identifiers having a context of dogs that overlap with a set created by the second user that includes object identifiers having a context of dogs. The object management service may then determine an object identifier included in the set associated with the first user that is not included in a set associated with the second user and suggest to the first user that the first user initiate a communication to the second user relating to dogs and that the first user share the determined object identifier with the second user as part of that communication.

Returning to FIG. 3, upon receiving the request for an object identifier, the example process 300 determines one or more suggested object identifiers, as in 304. As discussed above, and as further discussed below, suggested object identifiers may be determined based on a context of a communication, sets associated with users, other object identifiers shared by users as part of a communication, etc. The example process 300 then presents at least some of the suggested object identifiers to the user such that the user can select a suggested object identifier to include in a communication to another user, as in 306.

Figure 4:
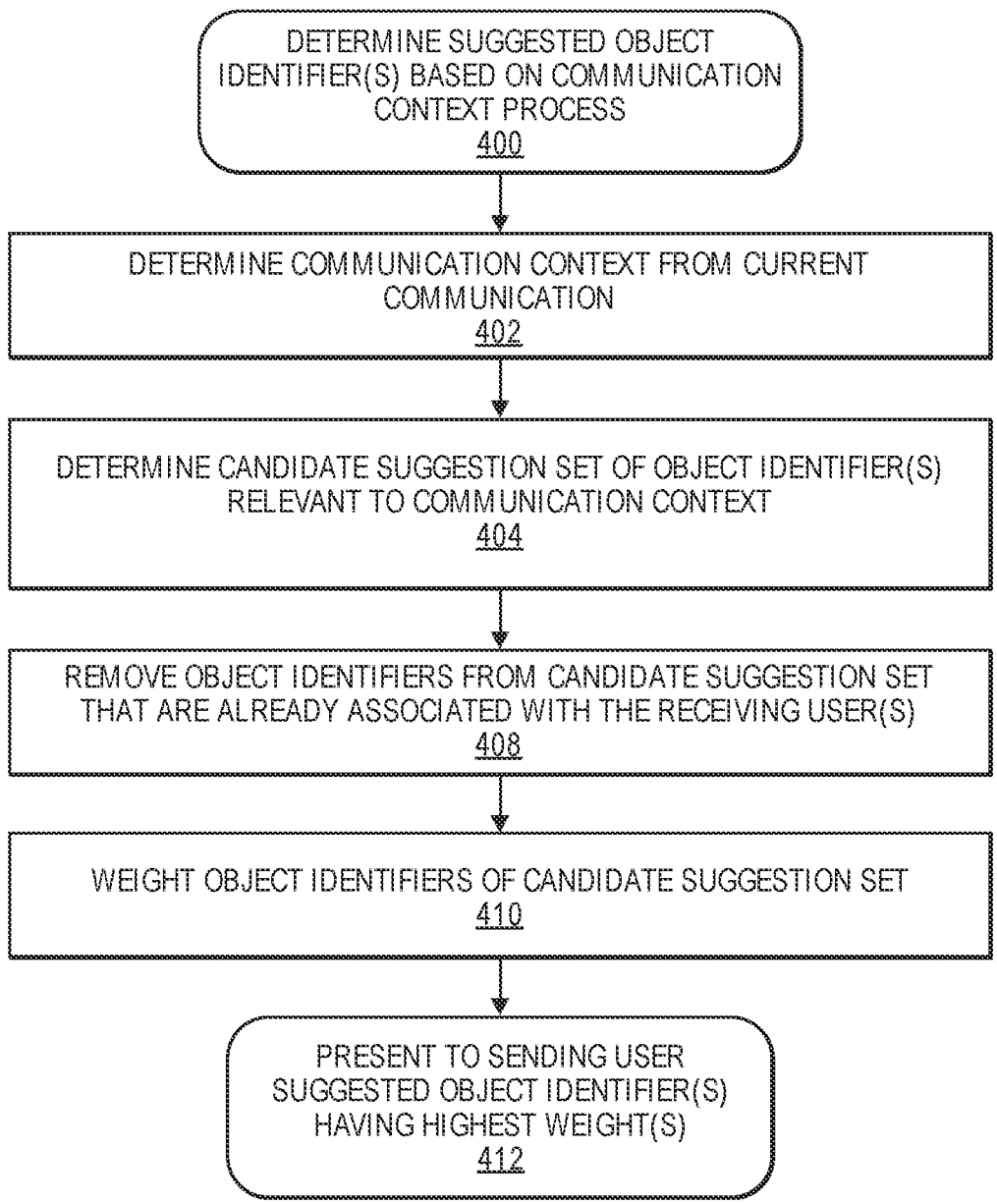
FIG. 4 illustrates an example process for determining suggested object identifier(s) based on communication context, according to an implementation.

FIG. 4 illustrates an example process 400 for determining suggested object identifier(s) based on a determined communication context of an existing communication between two or more users, according to an implementation. The example process 400 provides additional details for one implementation for determining suggested object identifiers.

The example process 400 begins by determining a communication context from the current communication between the two or more users, as in 402. The communication context may be determined using any one or more of a variety of techniques. In one implementation, the communications between the users are processed to identify one or more keywords and the keywords are normalized to a context maintained by the object management service. For example, communications from the first user may be compared with communications from the second user to determine terms (e.g., dog) that are used in both communications. Based on the frequency of terms, the context may be determined from the keywords having the highest frequency. Other techniques, such as natural language processing, term occurrence, etc., may likewise be used to determine a context of a communication.

In implementations when the communication is not textual based, other techniques may be utilized. For example, if the communication is image based, the object management service may process images and/or corresponding information included in the communication to determine an object or objects represented in the image(s). For example, the images may be processed using object recognition algorithms to determine an object represented in the image. Alternatively, or in addition thereto, image information may be processed to obtain information about the image that may be utilized to determine an object represented in the image. Based on the determined object(s), a context for the communication may be determined. In still another example, rather than processing the communication, the object management service may determine an object identifier that has already been shared by one of the users involved in the communication and determine a context associated with that object identifier.

Based on the determined context, a candidate suggestion set of object identifier(s) relevant to the communication context is determined, as in 404. As discussed above, the candidate suggestion set may include any object identifiers having a same or similar context to the determined communication context. In other implementations, the object identifiers included in the candidate suggestion set may be those associated with the sending user and having a same or similar context as the determined communication context.

Once the candidate suggestion set is determined, object identifiers included in the candidate suggestion set that are already associated with the receiving user are removed, as in 408. As discussed above, the object management service maintains a list of object identifiers associated with each user. By comparing the object identifiers included in the candidate suggestion set with the object identifiers associated with the receiving user, common object identifiers are determined and removed from the candidate suggestion set. In some implementations, it may also be determined which object identifiers of the candidate suggestion set have previously been viewed and/or sent to the receiving user, and those object identifiers may also be removed from the candidate suggestion set. In still other implementations, rather than removing the object identifiers from the candidate suggestion set that have already been viewed and/or sent to the receiving user, a weighting of those object identifiers may be decreased, as discussed below.

For the remaining object identifiers included in the candidate suggestion set, a weighting may be applied to those object identifiers, as in 410. The weighting may be used to determine which of the candidate object identifiers to present to the user for selection and inclusion in the communication. For example, object identifiers with a higher weight may be selected and provided to the sending user as suggested object identifiers. Weighting of an object identifier may be increased and/or decreased. For example, as discussed above, if it is determined that the receiving user has previously viewed and/or received the object identifier, a weighting of that object identifier may be decreased. In comparison, if the object identifier is popular among users, it may receive a higher weight. Weighting of an object identifier included in the candidate suggestion set may be determined based at least in part on one or more of a relevance of the object identifier to the sending user, a potential relevance of the object identifier to the receiving user(s), a time since the object identifier became associated with the first user, a relevance of the object identifier to the context, a rating of the object identifier, a number of sets of the first user in which the object identifier is associated, a time since the first user selected the object identifier, a co-occurrence or similarity of the object identifier to other object identifiers associated with the sending user and/or the receiving user(s), etc.

Based on the weighting of the object identifiers, one or more suggested object identifiers are presented to the sending user for selection and inclusion in a communication sent by the sending user to one or more receiving users, as in 412.

Figure 5:
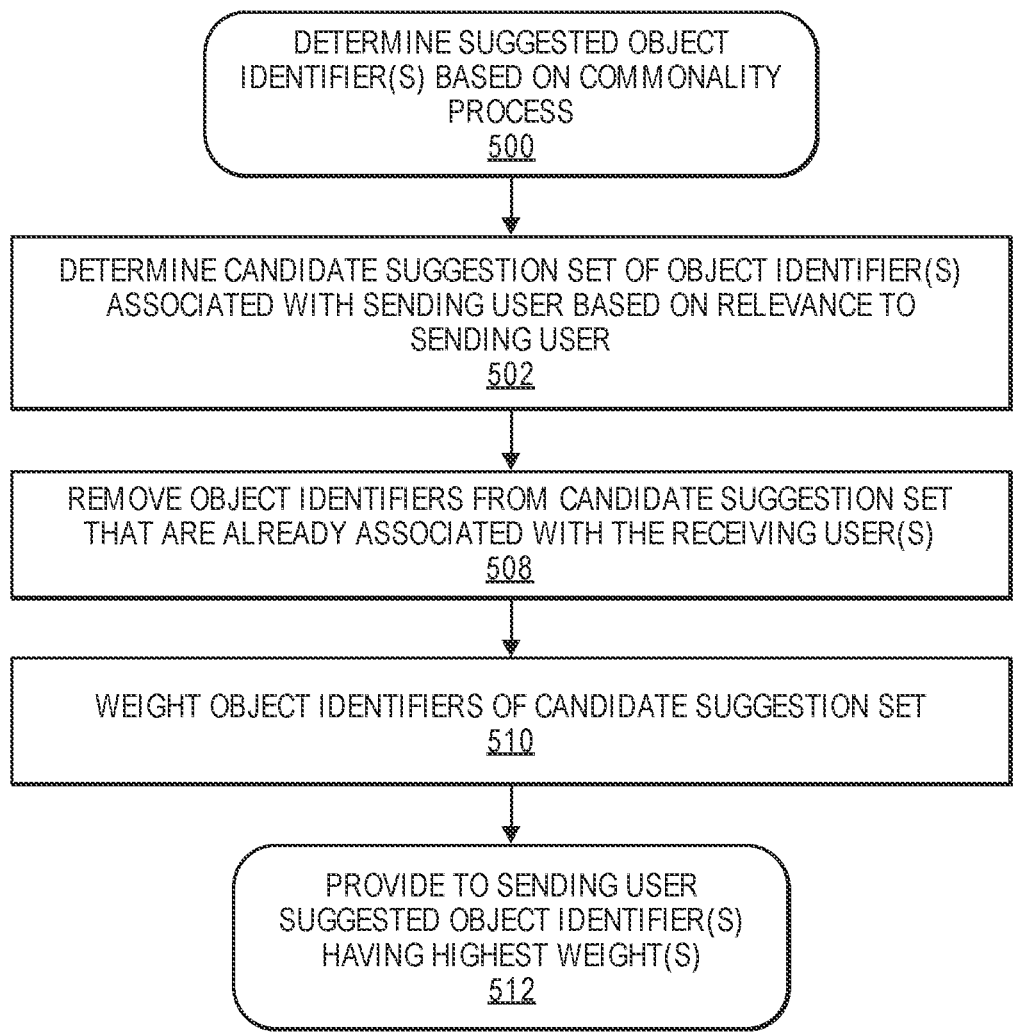
FIG. 5 illustrates an example process for determining suggested object identifier(s) based on commonality, according to an implementation.

FIG. 5 illustrates an example process for determining suggested object identifier(s) based on commonality, according to an implementation. The example process 500 provides additional details for another implementation for determining suggested object identifiers.

The example process 500 begins by determining a candidate suggestion set of object identifier(s) associated with the sending user based on relevance to the sending user, as in 502. An object identifier's relevance to the sending user may be based on, for example, a time since the user became associated with the object identifier, a number of sets associated with the user in which the object identifier is included, a frequency with which the object identifier is shared with other users, etc. In other implementations, a communication context may be determined and one or more sets associated with the user having a same communication context may be identified and object identifiers included in those sets may be added to the candidate suggestion set.

Once the candidate suggestion set is determined, object identifiers included in the candidate suggestion set that are already associated with the receiving user are removed, as in 508. As discussed above, the object management service maintains a list of object identifiers associated with each user. By comparing the object identifiers included in the candidate suggestion set with the object identifiers associated with the receiving object identifier, common object identifiers are determined and removed from the candidate suggestion set. In some implementations, it may also be determined which object identifiers of the candidate suggestion set have previously been viewed and/or sent to the receiving user, and those object identifiers may also be removed from the candidate suggestion set. In still other implementations, rather than removing the object identifiers from the candidate suggestion set that have already been viewed and/or sent to the receiving user, a weighting of those object identifiers may be decreased, as discussed below.

For the remaining object identifiers included in the candidate suggestion set, a weighting may be applied to those object identifiers, as in 510. The weighting may be used to determine which of the candidate object identifiers to present to the user for selection and inclusion in the communication. For example, object identifiers with a higher weight may be selected and provided to the sending user as suggested object identifiers. Weighting of an object identifier may be increased and/or decreased. For example, as discussed above, if it is determined that the receiving user has previously viewed and/or received the object identifier, a weighting of that object identifier may be decreased. In comparison, if the object identifier is popular among users, it may receive a higher weight. Weighting of object identifiers included in the candidate suggestion set may be determined based at least in part on one or more of a relevance of the object identifier to the sending user, a potential relevance of the object identifier to the receiving user(s), a time since the object identifier became associated with the first user, a relevance of the object identifier to the context, a rating of the object identifier, a number of sets of the first user in which the object identifier is associated, a time since the first user selected the object identifier, etc.

Based on the weighting of the object identifiers, one or more suggested object identifiers are presented to the sending user for selection and inclusion in a communication sent by the sending user to one or more receiving users, as in 512.

Figure 6:
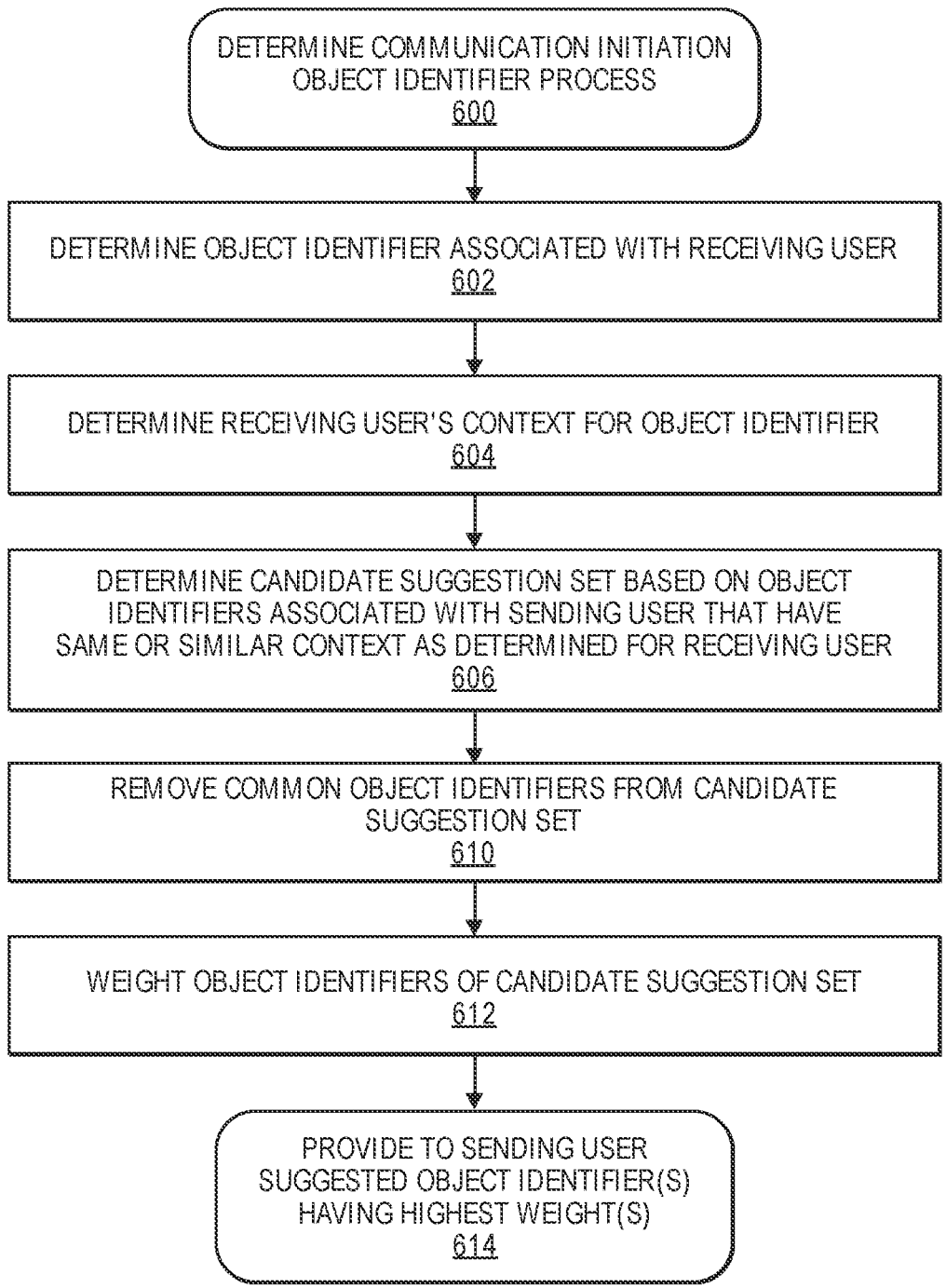
FIG. 6 illustrates an example process for determining a communication initiation object identifier, according to an implementation.

FIG. 6 illustrates an example process 600 for determining a communication initiation object identifier, according to an implementation. The example process 600 may be performed prior to a communication between two or more users and provides additional details for another implementation for determining suggested object identifiers.

The example process 600 begins by determining an object identifier associated with a receiving user, as in 602. In one implementation, an object identifier associated with the user may be randomly selected. In another implementation, the object identifier most recently associated with the receiving user may be selected. In still another example, all object identifiers associated with the receiving user may be selected. In yet another example, object identifiers that were recently accessed by the receiving user and/or those included in a set recently created or accessed by the receiving user may be selected.

Based on the determined object identifier(s) associated with the receiving user, a context is determined, as in 604. The context may be the context for the object identifier, in implementations when a single object identifier has been selected. In another example, the context may correspond to a context having a highest percentage of object identifiers associated with the receiving user associated therewith.

A candidate suggestion set is then determined and includes object identifiers associated with the sending user having a same or similar context to the context determined for the receiving user, as in 606. Likewise, any object identifiers included in the candidate suggestion set that are already associated with the receiving user and/or that have been previously viewed or sent to the receiving user may be removed from the candidate suggestion set, as in 610.

For the remaining object identifiers included in the candidate suggestion set, a weighting may be applied to those object identifiers, as in 612. The weighting may be used to determine which of the candidate object identifiers to present to the user for selection and inclusion in the communication. For example, object identifiers with a higher weight may be selected and provided to the sending user as suggested object identifiers. Weighting of an object identifier may be increased and/or decreased. For example, as discussed above, if it is determined that the receiving user has previously viewed and/or received the object identifier, a weighting of that object identifier may be decreased. In comparison, if the object identifier is popular among users, it may receive a higher weight. Weighting of object identifiers included in the candidate suggestion set may be determined based at least in part on one or more of a relevance of the object identifier to the sending user, a potential relevance of the object identifier to the receiving user(s), a time since the object identifier became associated with the first user, a relevance of the object identifier to the context, a rating of the object identifier, a number of sets of the first user in which the object identifier is associated, a time since the first user selected the object identifier, a co-occurrence or similarity to other object identifiers associated with the sending user and/or the receiving user(s), etc.

Based on the weighting of the object identifiers, one or more suggested object identifiers are presented to the sending user for selection and inclusion in a communication sent by the sending user to one or more receiving users, as in 612.

Figure 7:
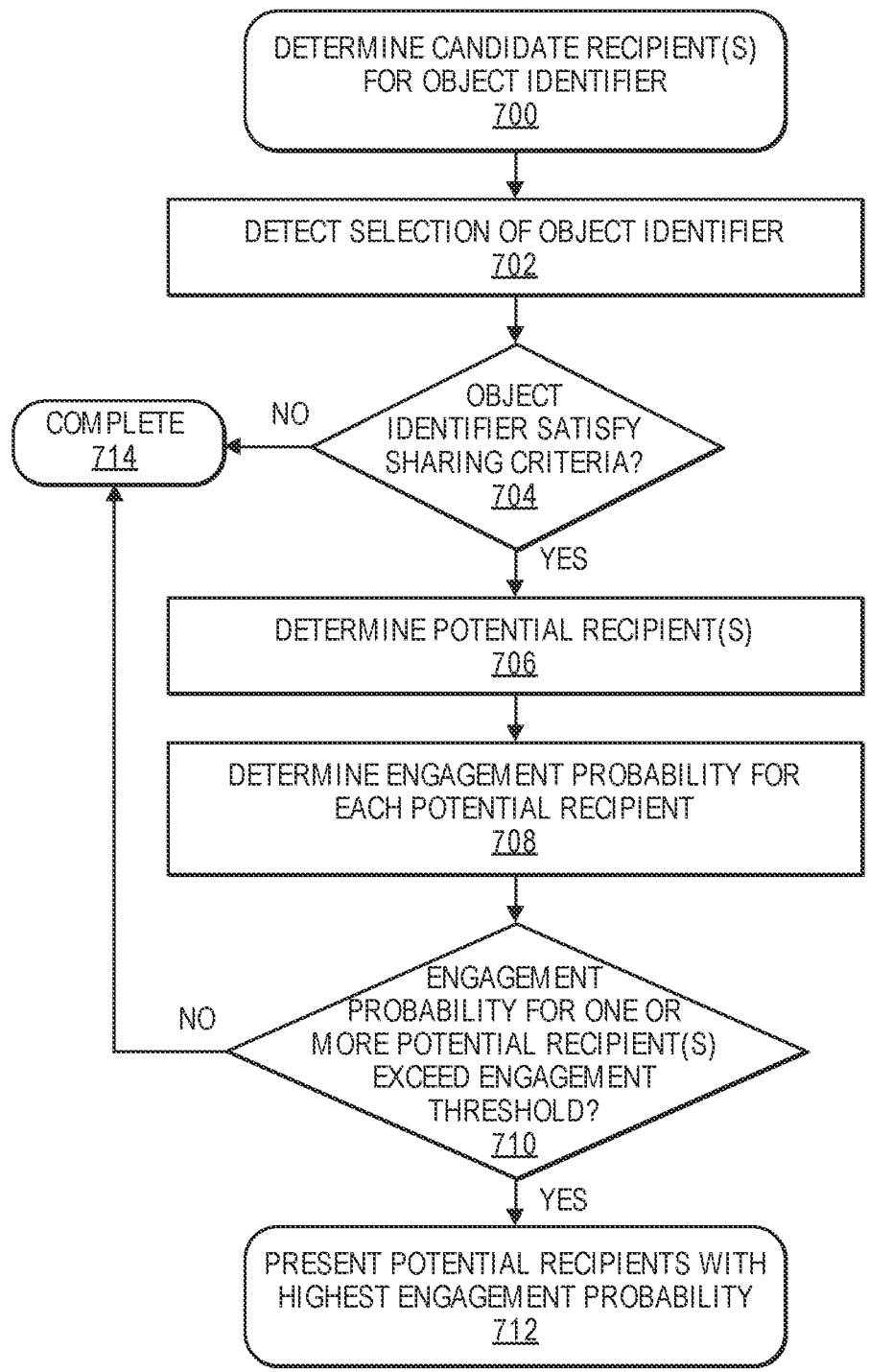
FIG. 7 illustrates an example process for determining candidate recipients for an object identifier, according to an implementation.

FIG. 7 illustrates an example process 700 for determining candidate recipients for an object identifier, according to an implementation. The example process 700 begins upon detection of a selection of an object identifier by a first user, as in 702. Selection of an object identifier may include, for example, the first user selecting, clicking on, gazing in the direction of, or otherwise viewing or interacting with an object identifier, such as an image of an object. Upon detecting selection of an object identifier, a determination is made as to whether the object identifier satisfies a sharing criterion, as in 704. A sharing criterion may indicate a quality or relevance of the object identifier and may be based on a variety of factors. For example, a sharing criterion may be based on the number of times the object identifier has been viewed by other users, a rating of the object identifier, comments or annotations associated with the object identifier, the number of sets associated with the object identifier, the number of times the object identifier has been shared, the number of times the object identifier has been selected, an age of the object identifier, a similarity of the object identifier with a second object identifier (e.g., a second object identifier associated with the first user, and/or a second object identifier associated with other users), etc.

If it is determined that the object identifier satisfies a sharing criterion, one or more potential recipients that may be suggested to the first user as candidate recipients for receiving the object identifier are determined, as in 706. Potential recipients may be determined based on, for example, one or more of an association or relationship with the first user and/or based on the object identifier. For example, users that are associated with, followed by, following, and/or otherwise known to the first user may all be determined as potential recipients. As another example, users that have selected, saved, shared, etc., other object identifiers that are similar to the selected object identifier may be determined as potential recipients. In still another example, potential recipients may be determined as a combination of users that are associated with the first user and that have selected, saved, shared, etc., other object identifiers that are similar to the selected object identifier. In still other examples, potential recipients may be determined based at least in part on the number of times the object identifier has been viewed or selected by the potential recipient, a number of times the first user has shared an object identifier with the potential recipient, etc.

For each potential recipient, an engagement probability indicating a probability that the potential recipient will engage with the object identifier is determined, as in 708. Engagement with an object identifier may include, but is not limited to, the potential recipient selecting the object identifier, saving the object identifier, sharing the object identifier, communicating with the first user in response to receiving a share of the object identifier, purchasing an object represented in the object identifier, etc. The engagement probability may be determined based on, for example, the current and/or historical activity of the potential recipient, the similarity or interaction between the first user and the potential recipient, the number and/or types of object identifiers associated with the potential recipient that are similar to the selected object identifier, etc. For example, if the selected object identifier is a representation of a dog, potential recipient A may be determined to have a higher engagement probability than potential recipient B if potential recipient A is known to interact regularly with the first user and is associated with ten other object identifiers that include representations of dogs, compared to potential recipient B who is also known to interact regularly with the first user but has no associated object identifiers that include representations of dogs.

In some implementations, one or more factors in computing the engagement probably may be weighted higher than other factors. For example, if a goal is to increase activity by a potential recipient, a time since the potential recipient was active or the frequency of activity by the potential recipient may be weighted higher than other factors such that potential recipients that are not already highly active receive a higher engagement probability, all other factors being equal. As another example, potential recipients that are already associated with the selected object identifier and/or potential recipients that have already viewed or received the object identifier may be given a lower weight for the engagement probability, or otherwise have their engagement probability decreased.

In some implementations, some aspects of a potential recipient may not be considered when determining an engagement probability for the potential recipient. For example, if a potential recipient is associated with an object identifier but has indicated that object identifier as private, that object identifier, information about that object identifier, and the association of that object identifier with the potential recipient will not be considered when determining the engagement probability for the potential recipient.

Returning to FIG. 7, upon determining the engagement probability for each of the potential recipients, it may be determined whether one or more of the engagement probabilities exceed an engagement threshold, as in 710. The engagement threshold may be any threshold value or score and may vary for different users, different selected objects, different times of day, different days of the year, etc. Likewise, in some implementations, the engagement threshold may be zero such that any engagement probability will be determined to exceed the engagement threshold. In such an example, the engagement threshold may be considered to not exist and the decision block 710 is omitted.

If it is determined that none of the engagement probabilities exceed the engagement threshold, or that the selected object identifier does not exceed the sharing criteria, the example process 700 completes, and no users are suggested to the first user as candidate recipients of the selected object identifier, as in 714. However, if one or more of the engagement probabilities exceed the engagement threshold, potential recipients with the highest engagement probabilities may be suggested to the first user as candidate recipient with which the first user could share the selected object identifier, as in 712. In some implementations, only those potential recipients having an engagement probability above the engagement threshold may be presented to the first user as candidate recipients. Likewise, in some implementation, the potential recipients may be ranked based on the engagement probabilities and only those potential recipients with the highest ranks may be presented to the first user as candidate recipients.

Figure 8:
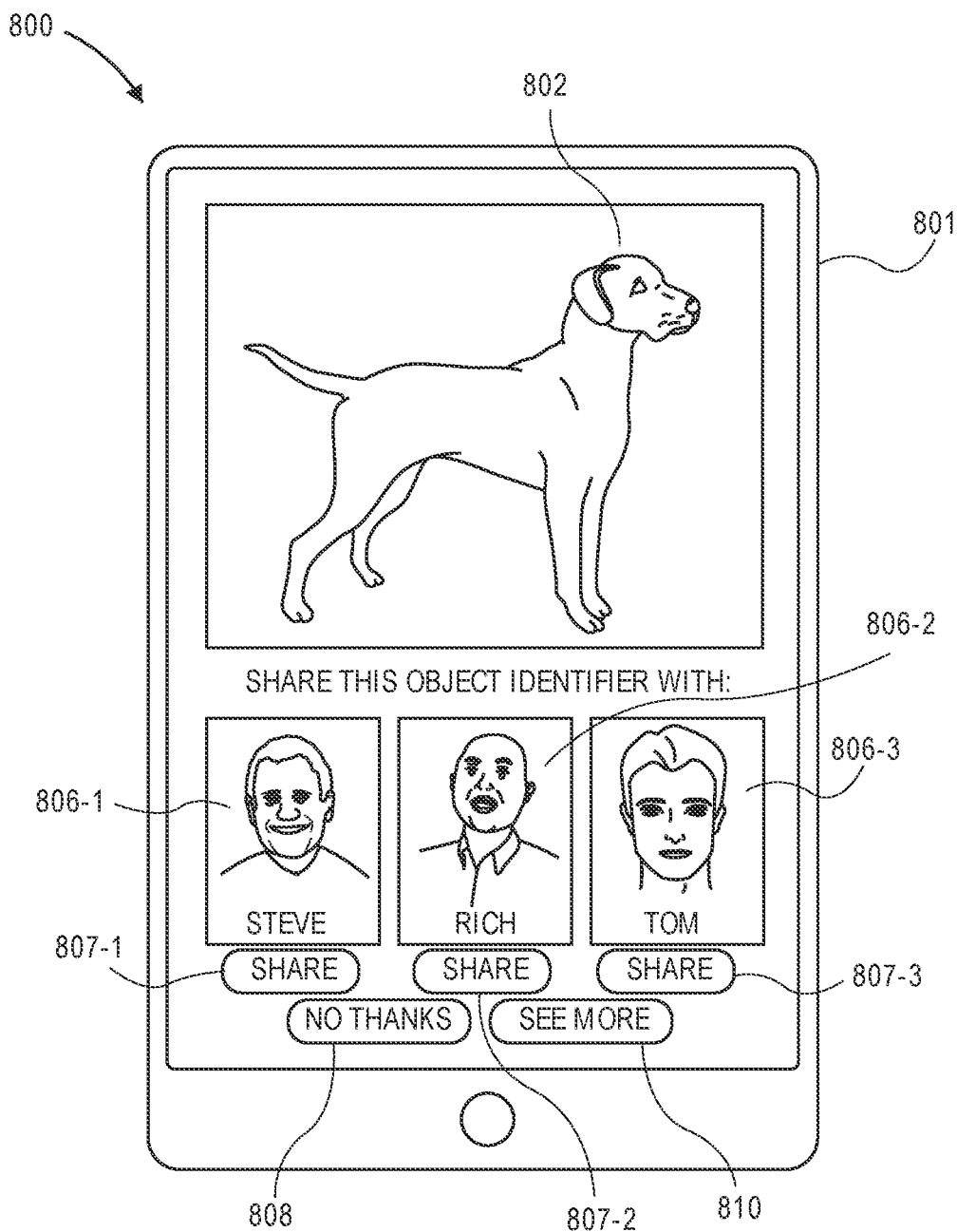
FIG. 8 illustrates an example illustration of a suggestion of candidate recipients for an object identifier, according to an implementation.

FIG. 8 is an example illustration 800 of a suggestion of candidate recipients for an object identifier, according to an implementation. In this example, a first user is browsing a social network using a portable device 801, such as a cell phone, tablet, laptop, etc., and has selected an object identifier 802, in this example an image of a dog. As discussed above, selection of an object identifier may be done by the user clicking or touching the presented object identifier to receive a detailed or close-up view of the object identifier 802, as illustrated in FIG. 8. In other examples, selection may be made by a user gazing at a particular object identifier, moving a cursor to the object identifier, or otherwise interacting with the object identifier.

The object management service, in this example, determines that the object identifier 802 satisfies one or more sharing criteria and determines three candidate recipients 806 that are suggested to the first user. Specifically, in this example, a first representation 806-1 representative of a first candidate recipient is presented on the display of the device 801 along with a first share control 807-1, a second representation 806-2 representative of a second candidate recipient is presented on the display of the device 801 along with a second share control 807-2, and a third representation 806-3 representative of a third candidate recipient is presented on the display of the device 801 along with a third share control 807-3. The first user may select to share the object identifier 802 with one or more of the candidate recipients 806 by selecting either the representation of the candidate recipient 806 or the corresponding share control 807. Alternatively, the first user may select not to share the object identifier 802 within anyone by selecting the "No Thanks" control 808 or view information about additional candidate recipients that were determined by the object management service by selecting the "See More" control 810.

By suggesting candidate recipients for a selected object, the first user is provided with immediate information about users that may be interested in viewing or receiving the object identifier. If the first user decides to share the selected object identifier with one or more of the candidate recipients, the first user may also select how the object identifier is shared. For example, the first user may select to email the selected object identifier, send a message, such as a multimedia message, to the candidate recipient(s), send a notification to the candidate recipient(s), send a link to the object identifier, etc.

In some implementations, the object management service may select object identifiers to share with two or more users that are browsing or interacting with the object management service, or a social network maintained by the object management service. For example, the object management service may determine two or more users that are concurrently browsing a social network site, determine a connection between the users and/or their browsing, and select one or more object identifiers to share with those users. For example, the object management service may determine that two users are independently browsing object identifiers related to weddings, determine that the two users are associated and often share information about weddings. Based at least in part on that information, the object management service may determine a connection between the users related to weddings. In addition, the object management service may determine one or more object identifiers that have not been viewed by either user but that are related to weddings and suggest those object identifiers to each user as of potential interest. Such suggestions may result in the users establishing a communication during their current browsing session, expanding their discovery of object identifiers related to the current topic (e.g., weddings), and communicating other information among each other.

Figure 9:
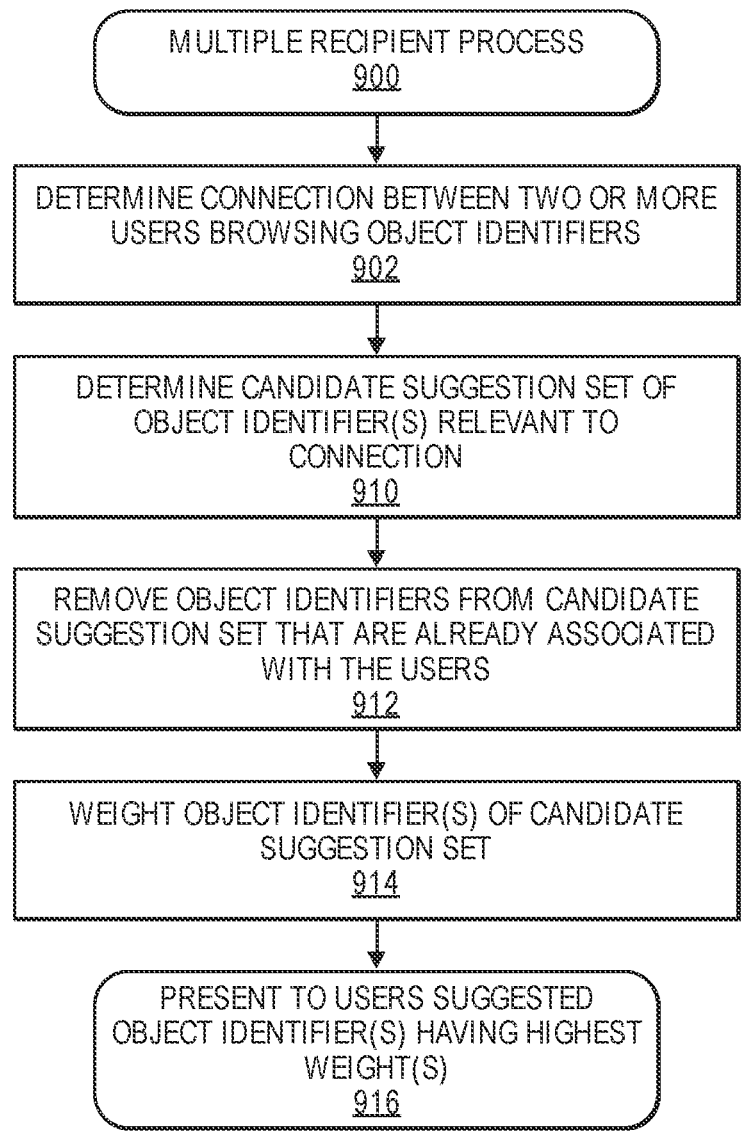
FIG. 9 illustrates an example process for determining multiple recipients for an object identifier, according to an implementation.

FIG. 9 illustrates an example process 900 for determining multiple users for an object identifier, according to an implementation. The example process 900 begins by determining a connection between two or more users that are browsing object identifiers, as in 902. A "connection," as used herein, may be any determined similarity in browsing history between two or more users that are associated. For example, if two users are associated and are often browsing object identifiers related to Maui, Hawaii, the two users may be determined to have a connection because they are associated with each other and they are both currently interested in Maui, Hawaii. As will be appreciated, any variety of similarities or relationships may be determined to establish a connection between two or more users. In some implementations, other factors, such as the location of the users, affirmative indications by the users of willingness to share information or object identifiers, the types of object identifiers being browsed by the two or more users, an input received from the two or more users, an input received from another user, etc., may also be considered in determining a connection between two or more users.

Based on the determined connection and the object identifiers currently being browsed by the two or more users, a candidate suggestion set of object identifier(s) relevant to the connection is determined, as in 910. The candidate suggestion set may include any object identifiers having a same or similar context to the determined connection, the users, and/or the object identifiers being browsed by the users.

Once the candidate suggestion set is determined, object identifiers included in the candidate suggestion set that are already associated with the receiving users and/or already viewed by the receiving users are removed, as in 912. As discussed above, the object management service maintains a list of object identifiers associated with each user. By comparing the object identifiers included in the candidate suggestion set with the object identifiers associated with the receiving users and/or already viewed by the receiving users, common object identifiers are determined and removed from the candidate suggestion set. In other implementations, rather than removing the object identifiers from the candidate suggestion set that have already been viewed and/or sent to the receiving users, a weighting of those object identifiers may be decreased.

For the remaining object identifiers included in the candidate suggestion set, a weighting may be applied to those object identifiers, as in 914. The weighting may be used to determine which of the candidate object identifiers to present to the users. For example, object identifiers with a higher weight may be selected and provided to the users as suggested object identifiers that are relevant to the current browsing of those users. Weighting of an object identifier may be increased and/or decreased. For example, as discussed above, if it is determined that one or more of the receiving users have previously viewed and/or received the object identifier, a weighting of that object identifier may be decreased. In comparison, if the object identifier is popular among users, it may receive a higher weight. Weighting of an object identifier included in the candidate suggestion set may be determined based at least in part on one or more of a relevance of the object identifier to the users, a time since the object identifier was viewed by either of the users, a relevance of the object identifier to the connection, a rating of the object identifier, a number of sets with which the object identifier is associated, a time since either user selected the object identifier, a co-occurrence or similarity of the object identifier to other object identifiers associated with either user and/or the receiving user(s), etc.

Based on the weighting of the object identifiers, one or more suggested object identifiers are presented to the users as object identifiers of potential common interest to the two users with respect to the connection, as in 916.

Figure 10:
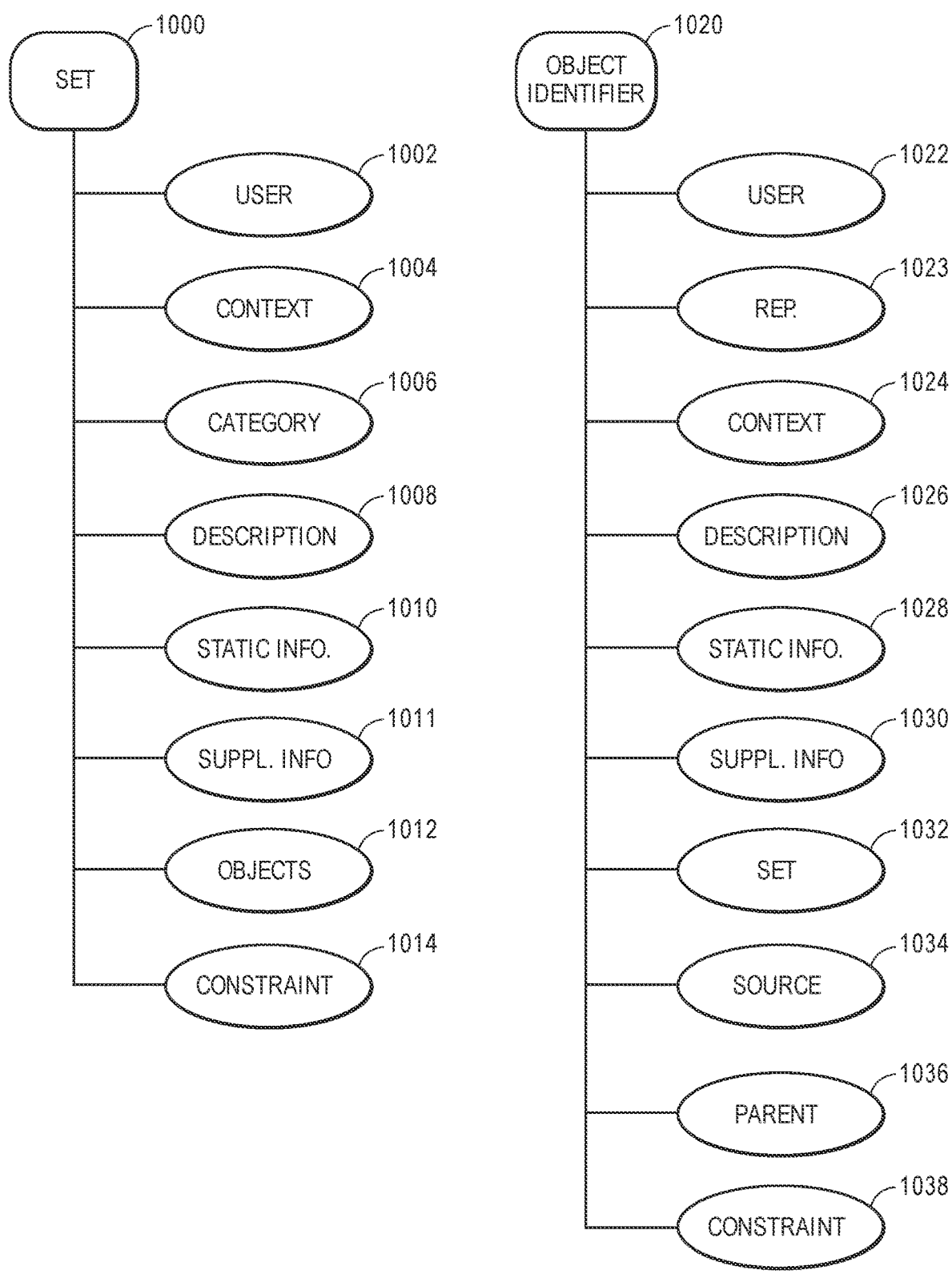
FIG. 10 is a block diagram of an example structure of a set and an object identifier, according to an implementation.

FIG. 10 is a block diagram of an example structure of a set 1000 and an object identifier 1020, according to an implementation. As discussed above, a set 1000 may include an identification of the user 1002 that created the set and any users that have been identified as allowed to add object identifiers to the set. In addition, a context 1004, as provided by a user or determined by the object management service 1322 (FIG. 13), may be associated with the set 1000 along with a user selected category 1006. A category 1006 may be selected from a list of preexisting categories provided by the object management service 1322. For example, a category 1006 may be animals, books, arts and entertainment, sports, food and drink, etc., and a user, upon creating a set 1000, may select one or more of those categories for association with the set 1000. A user may also provide a description 1008 providing information about the set 1000 from the user's perspective. Static information 1010 may also be associated with the set 1000. For example, the object management service 1322 may 1322 may automatically incorporate certain information relevant to a set 1000 based on the selected category and, optionally, the provided description 1008. Static information 1010 may also include information provided by the creator of the set and/or other users of the object management service 1322. For example, other users may view, comment and/or otherwise provide feedback with respect to a set. Comments and/or other feedback from the creator and/or other users may be associated with the set 1000 and maintained as static information 1010.

Supplemental information 1011 relevant to the set 1000 may also be maintained.

Supplemental information for a set may be any form of information or action provided by a source of one or more representations associated with the set, a source of one or more objects associated with a set, or any other external source. For example, if the set is about Hawaii, a weather service (external source) may provide supplemental information in the form of weather in Hawaii that is associated with the set. As object identifiers are added to the set 1000, they may be identified as objects 1012 associated with the set 1000.

Finally, constraints 1014 may also be associated with the set 1000 and used to control access, modification or other aspects of the set 1000. For example, the creator of a set 1000 may specify constraints as to who can view the set, add object identifiers to the set, whether users can comment on the set, etc.

In some implementations, an object identifier 1020 may include an identification of the user 1022 that created the object identifier 1020, a user provided description 1026 describing the object identifier from the user's perspective, and static information 1028. Similar to the set 1000, the static information 1028 may be included in the object identifier 1020 by the object management service 1322 based on the selected representation 1023 of the object and/or the description provided by the user. For example, if a user has selected a representation 1023 of the object that is already known to the object management service, existing information about the representation may be included in the object identifier 1020. Other static information about an object identifier 1020 may include comments provided by other users of the object management service 1322, the creator of the object identifier, etc.

A representation 1023 may also be included in the object identifier. The representation may be any element that can be used to represent the object. For example, the representation may be a graphical representation of the object, an audio representation of an object, or any other representation of an object.

The context 1024 of the object identifier describes the object from the perspective of the user. The context may include one or more descriptive terms for the object represented in the object identifier. In one implementation, the object management service may maintain a list of contexts and, as object identifiers are created and/or associated with a user, the object management service may determine a context for the object identifier based on the user's perspective. For example, an object identifier that includes an image of a dolphin may have different contexts depending on the user. The context may be determined based on the description 1026 provided by the user, the set with which the object identifier is associated, etc. As an illustration, if the user associates the object identifier that includes a representation of a dolphin with a set that includes other object identifiers representative of sea life (e.g., sharks, whales, and fish), the context may be aquatic, or sea life. In comparison, if the user associates the object identifier that includes a representation of a dolphin with a set that includes other object identifiers representative of the Miami Dolphins football team, it may be determined that the context of the object identifier, from the perspective of the user, is football.

In addition to the object management service 1322 providing static information 1028, in some implementations, supplemental information 1030 may also be associated with the object identifier 1020. Supplemental information may be any form of information or action provided by a source of the representation, a source of the object, or any other external source. For example, the source of the object may provide information about the object while other external sources may provide actions relevant to the object. For example, if the object is a television, the source of the television may be the manufacturer, such as Sony, and that source may provide basic information about the object. In this example, the information about the object provided by the manufacturer may include the dimensions, resolution, weight, etc. Other external sources, such as sellers of the television, may provide additional supplemental information that may be associated with the object identifier 1020. For example, sellers of the object may provide actions that allow a user viewing the object identifier 1020 to initiate a purchase of the object, obtain additional information about the object, obtain information about the external source selling the object, etc.

Returning to FIG. 10, the object identifier 1020 may also identify a source 1034 from which the representation of the object was obtained, or the source of the object. In addition to providing a source 1034, if the object identifier was based upon and created from another existing object identifier, that existing object identifier may be identified in the object identifier 1020 as the parent 1036 of the object identifier 1020. Finally, constraints 1038 may 1038 may also be associated with the object identifier 1020 and used to control access, modification or other aspects of the object identifier 1020. For example, the creator of an object identifier 1020 may specify constraints as to whether the object identifier can be viewed by other users, copied into other sets 1032, whether users can comment on the object identifier, etc.

Figure 11:
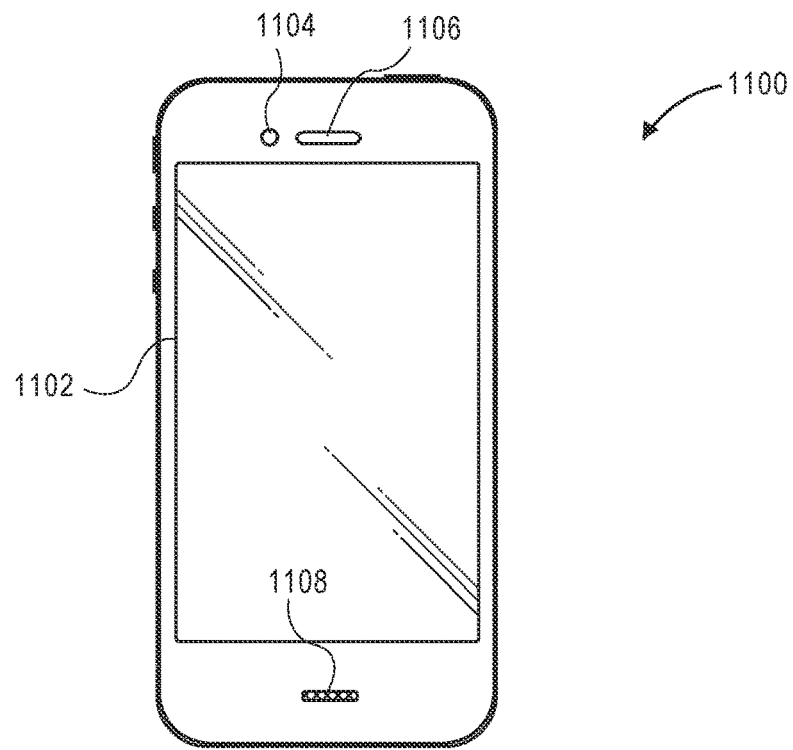
FIG. 11 illustrates an example computing device that can be used in accordance with various implementations.

FIG. 11 illustrates an example client device 1100 that can be used in accordance with various implementations described herein. In this example, the client device 1100 includes a display 1102 and optionally at least one input component 1104, such as a camera, on a same side of the device as the display 1102. The client device 1100 may also include an audio transducer, such as a speaker 1106, and optionally a microphone 1108. Generally, the client device 1100 may have any form or input/output components that allow a user to interact with the client device 1100. For example, the various input components for enabling user interaction with the device may include a touch-based display 1102 (e.g., resistive, capacitive), camera (for gesture tracking, etc.), microphone, global positioning system (GPS), compass or any combination thereof. One or more of these input components may be included on a device or otherwise in communication with the device. Various other input components and combinations of input components can be used as well within the scope of the various implementations as should be apparent in light of the teachings and suggestions contained herein.

Figure 12:
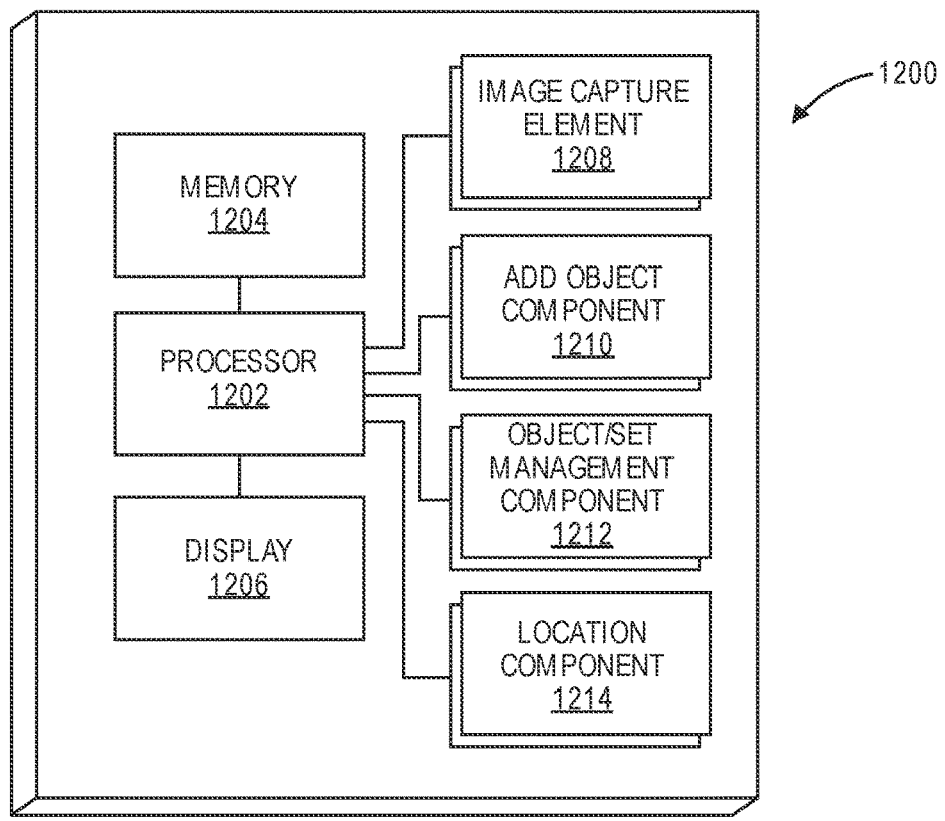
FIG. 12 illustrates an example configuration of components of a computing device, such as that illustrated in FIG. 11.

In order to provide the various functionality described herein, FIG. 12 illustrates an example set of basic components 1200 of a client device 1100, such as the client device 1100 described with respect to FIG. 11 and discussed herein. In this example, the device includes at least one central processor 1202 for executing instructions that can be stored in at least one memory device or element 1204. As would be apparent to one of ordinary skill in the art, the device can include many types of memory, data storage or computer-readable storage media, such as a first data storage for program instruction for execution by the processor 1202. Removable storage memory can be available for sharing information with other devices, etc. The device typically will include some type of display 1206, such as a touch-based display, electronic ink (e-ink), organic light emitting diode (OLED) or liquid crystal display (LCD).

As discussed, the device in many implementations will include at least one image capture element 1208, such as one or more cameras, that are able to image objects in the vicinity of the device. An image capture element can include, or be based at least in part upon, any appropriate technology, such as a CCD or CMOS image capture element having a determined resolution, focal range, viewable area, and capture rate. The device can include at least one add object component 1210 for performing the process of creating an object identifier that identifies an object, and/or interacting with the object management service 1322 as part of the process of creating an object identifier that identifies an object. For example, the client device may be in constant or intermittent communication with the object management service and may exchange information, such as representations, descriptions, source information, etc., with the object management service as part of the process for creating an object identifier for an object.

The device may also include an object management component 1212 that stores and manages information about existing object identifiers and/or sets created by or otherwise associated with the user of the client device. Storing and maintaining such information on the device provides the ability for a user to interact with and use many of the various implementations discussed herein even in the event the client device cannot communicate with the object management service. For example, if the client device is not able to communicate with the object management service, the object management component 1212 may, in response to a request for an object identifier to share, process the communication using any of the techniques discussed above and determine a candidate suggestion set that includes object identifiers maintained at the client device by the object management component 1212. One or more of those object identifiers may then be presented to the user for selection and presentation to a receiving user as part of a communication.

The device also can include at least one location component 1214, such as GPS, NFC location tracking or Wi-Fi location monitoring. Location information obtained by the location component 1214 may be used with the various implementations discussed herein to identify the location of the user, source location, object location, and the like and support the creation, modification and/or management of sets and/or object identifiers.

The example client device may also include at least one additional input device able to receive conventional input from a user. This conventional input can include, for example, a push button, touch pad, touch-based display, wheel, joystick, keyboard, mouse, trackball, keypad or any other such device or element whereby a user can input a command to the device. These I/O devices could be connected by a wireless, infrared, Bluetooth, or other link as well in some implementations. In some implementations, however, such a device might not include any buttons at all and might be controlled only through touch (e.g., touch-based display), audio (e.g., spoken) commands, or a combination thereof.

Figure 13:
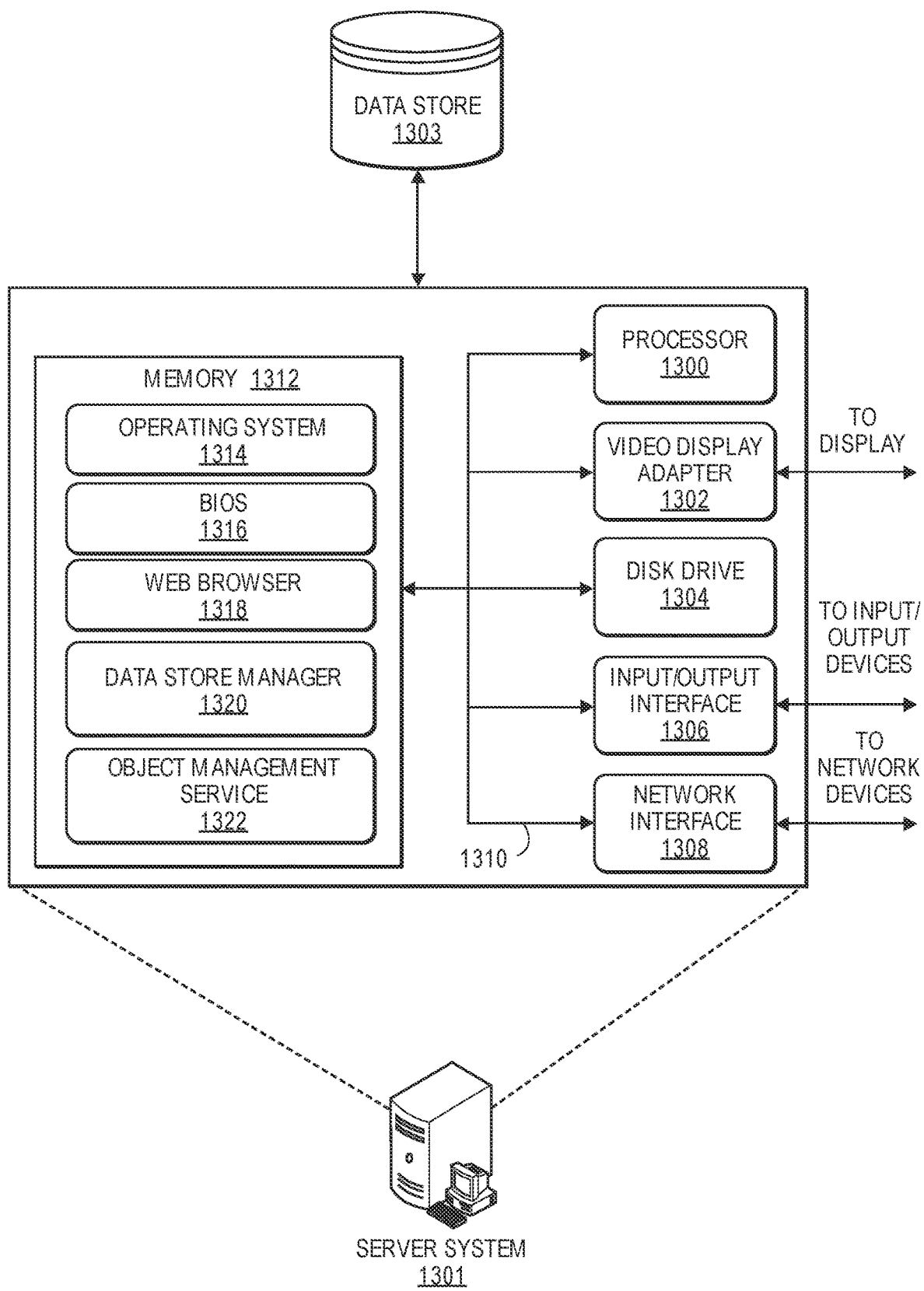
FIG. 13 is a pictorial diagram of an illustrative implementation of a server system that may be used for various implementations.

FIG. 13 is a pictorial diagram of an illustrative implementation of a server system, such as the server system 1301, that may be used with the implementations discussed herein. The server system 1301 may include a processor 1300, such as one or more redundant processors, a video display adapter 1302, a disk drive 1304, an input/output interface 1306, a network interface 1308, and a memory 1312. The processor 1300, the video display adapter 1302, the disk drive 1304, the input/output interface 1306, the network interface 1308, and the memory 1312 may be communicatively coupled to each other by a communication bus 1310.

The video display adapter 1302 provides display signals to a local display (not shown in FIG. 13) permitting an operator of the server system 1301 to monitor and configure operation of the server system 1301. The input/output interface 1306 likewise communicates with external input/output devices not shown in FIG. 13, such as a mouse, keyboard, scanner, or other input and output devices that can be operated by an operator of the server system 1301. The network interface 1308 includes hardware, software, or any combination thereof, to communicate with other computing devices. For example, the network interface 1308 may be configured to provide communications between the server system 1301 and other computing devices, such as the client device 100 (FIG. 1).

The memory 1312 generally comprises random access memory (RAM), read-only memory (ROM), flash memory, and/or other volatile or permanent memory. The memory 1312 is shown storing an operating system 1314 for controlling the operation of the server system 1301. A binary input/output system (BIOS) 1316 for controlling the low-level operation of the server system 1301 is also stored in the memory 1312.

The memory 1312 additionally stores program code and data for providing network services that allow client devices to exchange information and data files with the server system 1301 and/or the object management service 1322. Accordingly, the memory 1312 may store a browser application 1318. The browser application 1318 comprises computer executable instructions, that, when executed by the processor 1300, generate or otherwise obtain configurable markup documents such as Web pages. The browser application 1318 communicates with a data store manager application 1320 to facilitate data exchange and mapping between the data store 1303, and/or one or more client devices, such as the client device 100 shown in FIG. 1.

As used herein, the term "data store" refers to any device or combination of devices capable of storing, accessing and retrieving data, which may include any combination and number of data servers, databases, data storage devices and data storage media, in any standard, distributed or clustered environment. The server system 1301 can include any appropriate hardware and software for integrating with the data store 1303 as needed to execute aspects of one or more of the implementations discussed herein. The server system 1301 provides access control services in cooperation with the data stores 1303 and is able to generate content, such as text, graphics, audio, video and/or object identifier or set related information (e.g., representations, context, descriptions, mappings, and analytics about user interfaces) for use in determining object identifiers to suggest for sharing as part of a communication.

The data store 1303 can include several separate data tables, databases or other data storage mechanisms and media for storing data relating to a particular aspect. For example, the data store 1303 illustrated includes mechanisms for storing content, user information, object identifiers, sets, associations between users and object identifiers and/or sets, etc., which can be used to generate and deliver suggested object identifiers to client devices 100.

It should be understood that there can be many other aspects that may be stored in the data store 1303. The data store 1303 is operable, through logic associated therewith, to receive instructions from the server system 1301 and obtain, update or otherwise process data in response thereto.

The memory 1312 may also include the object management service 1322, discussed above. The object management service 1322 may be executable by the processor 1300 to implement one or more of the functions of the server system 1301. In one implementation, the object management service 1322 may represent instructions embodied in one or more software programs stored in the memory 1312. In another implementation, the object management service 1322 can represent hardware, software instructions, or a combination thereof.

The server system 1301, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction in FIG. 13 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
under control of one or more computing systems configured with executable instructions,
receiving from a first user a request for an object identifier to include in a communication between the first user and a second user, wherein:
the communication includes a first message sent from the first user to the second user;
the communication includes a second message sent from the second user to the first user; and
the first message and the second message were sent at a time prior to receiving from the first user the request;
processing the first message and the second message to determine a context corresponding to the communication;
determining a candidate suggestion set that includes a plurality of object identifiers associated with the first user, wherein each of the plurality of object identifiers are determined based at least in part on the context;

removing from the candidate suggestion set a first object identifier of the plurality of object identifiers that is associated with the second user; and presenting to the first user at least one of the plurality of object identifiers included in the candidate suggestion set for selection by the first user to include in the communication between the first user and the second user.

2. The computer-implemented method of claim 1, wherein processing the first message and the second message includes:

analyzing first textual information included in the first message to determine a first keyword;

analyzing second textual information included in the second message to determine a second keyword; and determining the context based on at least the first keyword and the second keyword.

3. The computer-implemented method of claim 1, wherein processing the first message and the second message includes:

analyzing first information included in the first message to determine a first object represented by the first information;

analyzing second information included in the second message to determine a second object represented by the second information; and determining the context based on at least the first object and the second object.

4. The computer-implemented method of claim 1, further comprising:

weighting the plurality of object identifiers included in the candidate suggestion set; and wherein presenting to the first user at least one of the plurality of object identifiers includes:

presenting to the first user a second object identifier of the plurality of object identifiers included in the candidate suggestion set having a highest weight.

5. A non-transitory computer-readable storage medium storing instructions to suggest at least one object identifier for including in a communication, the instructions when executed by a processor causing the processor to at least:

receive from a first user a request for an object identifier for including in the communication between the first user and a second user;

determine a candidate suggestion set that includes a plurality of object identifiers associated with the first user;

remove from the candidate suggestion set a first object identifier of the plurality of object identifiers that is associated with the second user; and present to the first user at least one of the plurality of object identifiers included in the candidate suggestion set for selection by the first user for including in the communication between the first user and the second user.

6. The computer-readable storage medium of claim 5, wherein:

the communication between the first user and the second user includes:

a first message sent from the first user to the second user; and a second message sent from the second user to the first user;

the instructions when executed by the processor further causing the processor to at least process the first message and the second message to determine a context corresponding to the communication; and the candidate suggestion set is determined based at least in part on the context.

7. The computer-readable storage medium of claim 5, wherein the instructions when executed by the processor further cause the processor to at least:

remove from the plurality of object identifiers included in the candidate suggestion set any object identifiers previously viewed by the second user.

8. The computer-readable storage medium of claim 5, wherein the instructions that when executed by the processor to cause the processor to determine the candidate suggestion set further cause the processor to at least:

determine a first object identifier previously included in the communication by either the first user or the second user;

determine a context associated with the first object identifier; and determine the plurality of object identifiers associated with the first user that are also associated with the context.

9. The computer-readable storage medium of claim 5, wherein the instructions that when executed by the processor to cause the processor to determine the candidate suggestion set further cause the processor to at least:

determine a set associated with the second user that includes at least one second object identifier;

determine a context corresponding to the set; and determine the plurality of object identifiers associated with the first user that are also associated with the context.

10. The computer-readable storage medium of claim 5, wherein the instructions that when executed by the processor to cause the processor to determine the candidate suggestion set further cause the processor to at least:

determine a first set associated with the first user that includes a first plurality of object identifiers;

determine a second set associated with the second user that includes a second plurality of object identifiers;

determine that at least one second object identifier of the first plurality of object identifiers and at least one third object identifier of the second plurality of object identifiers correspond to a same object; and determine the candidate suggestion set to include object identifiers included in the first set that are not included in the second set.

11. The computer-readable storage medium of claim 10, wherein:

the instructions that when executed by the processor to cause the processor to determine the candidate suggestion set further cause the processor to at least determine a context corresponding to the communication;

the first set corresponds to the context; and the second set corresponds to the context.

12. A method, comprising:

receiving at a computing device a request from a first user for a first object identifier to include in a communication from the first user to a second user;

determining a second object identifier associated with the second user;

determining a plurality of object identifiers associated with the first user that are similar to the second object identifier;

selecting the first object identifier from the plurality of object identifiers such that the first object identifier is not associated with the second user; and providing, at the computing device, the first object identifier to the first user for inclusion in the communication from the first user to the second user.

13. The method of claim 12, further comprising:

determining a context associated with the second object identifier; and wherein determining the plurality of object identifiers includes determining object identifiers associated with the first user that are also associated with the context.

14. The method of claim 12, further comprising:

weighting the plurality of object identifiers based on one or more of a relevance to the first user or a potential relevance to the second user; and wherein selecting the first object identifier is based at least in part on the weighting.

15. The method of claim 12, further comprising:

selecting the first object identifier from the plurality of object identifiers such that the second user has not previously viewed the first object identifier.

16. The method of claim 12, further comprising:

determining, based at least in part on browsing histories associated with the first user and the second user, a connection between the first user and the second user;

determining, based at least in part on the connection and the browsing histories, a candidate suggestion set having a second plurality of object identifiers associated with a context of the connection;

removing at least one third object identifier that is associated with at least one of the first user or the second user from the candidate suggestion set; and causing at least one fourth object identifier from the candidate suggestion set to be presented to the first user and the second user.

* * * * *